US010918461B2

(12) United States Patent
Oliver

(10) Patent No.: US 10,918,461 B2
(45) Date of Patent: Feb. 16, 2021

(54) ORTHODONTIC APPLIANCE

(71) Applicant: ALLIANCE EVANGELIQUE REFORMEE-INSTITUT FAREL, FACULTE DE THEOLOGIE REFORMEE DE QUEBEC, Montréal (CA)

(72) Inventor: Bruce Malcom Oliver, Montreal (CA)

( * ) Notice: Subject to any disclaimer, the term of this patent is extended or adjusted under 35 U.S.C. 154(b) by 34 days.

(21) Appl. No.: 16/323,574

(22) PCT Filed: Aug. 30, 2017

(86) PCT No.: PCT/CA2017/051018
§ 371 (c)(1),
(2) Date: Feb. 6, 2019

(87) PCT Pub. No.: WO2018/039790
PCT Pub. Date: Mar. 8, 2018

(65) Prior Publication Data

US 2019/0223985 A1    Jul. 25, 2019

Related U.S. Application Data

(60) Provisional application No. 62/381,364, filed on Aug. 30, 2016.

(51) Int. Cl.
*A61C 7/28* (2006.01)
*A61C 7/20* (2006.01)
*A61C 7/12* (2006.01)
*A61C 7/06* (2006.01)
*A61C 7/36* (2006.01)

(52) U.S. Cl.
CPC ............... *A61C 7/28* (2013.01); *A61C 7/06* (2013.01); *A61C 7/12* (2013.01); *A61C 7/20* (2013.01); *A61C 7/36* (2013.01)

(58) Field of Classification Search
CPC .... A61C 7/28; A61C 7/06; A61C 7/12; A61C 7/20; A61C 7/36; A61C 7/10
USPC .......................................................... 433/10
See application file for complete search history.

(56) References Cited

U.S. PATENT DOCUMENTS

| | | | | |
|---|---|---|---|---|
| 4,531,911 A | * | 7/1985 | Creekmore | A61C 7/12 433/8 |
| 5,046,948 A | * | 9/1991 | Miura | A61C 7/00 433/18 |
| 5,944,518 A | * | 8/1999 | Sabbagh | A61C 7/36 433/19 |
| 5,964,588 A | * | 10/1999 | Cleary | A61C 7/36 433/18 |

(Continued)

*Primary Examiner* — Cris L. Rodriguez
*Assistant Examiner* — Mirayda A Aponte
(74) *Attorney, Agent, or Firm* — Brouillette Legal Inc.; Robert Brouillette

(57) ABSTRACT

An orthodontic appliance for installation on an archwire is described. The orthodontic appliance has two archwire sliding parts, for sliding along an archwire, a telescoping assembly linking the two archwire sliding parts to one another, an external force conveyer and a spring secured to one of the archwire sliding parts. The telescoping assembly is offset from the archwire on which it is to be installed. A method for exerting pressure on a target orthodontic bracket that is connected to adjacent orthodontic brackets by an archwire is also described. The method uses the described orthodontic appliance.

20 Claims, 9 Drawing Sheets

(56) References Cited

U.S. PATENT DOCUMENTS

2014/0255866 A1* 9/2014 Faust ...................... A61C 7/20
                                                              433/19

* cited by examiner

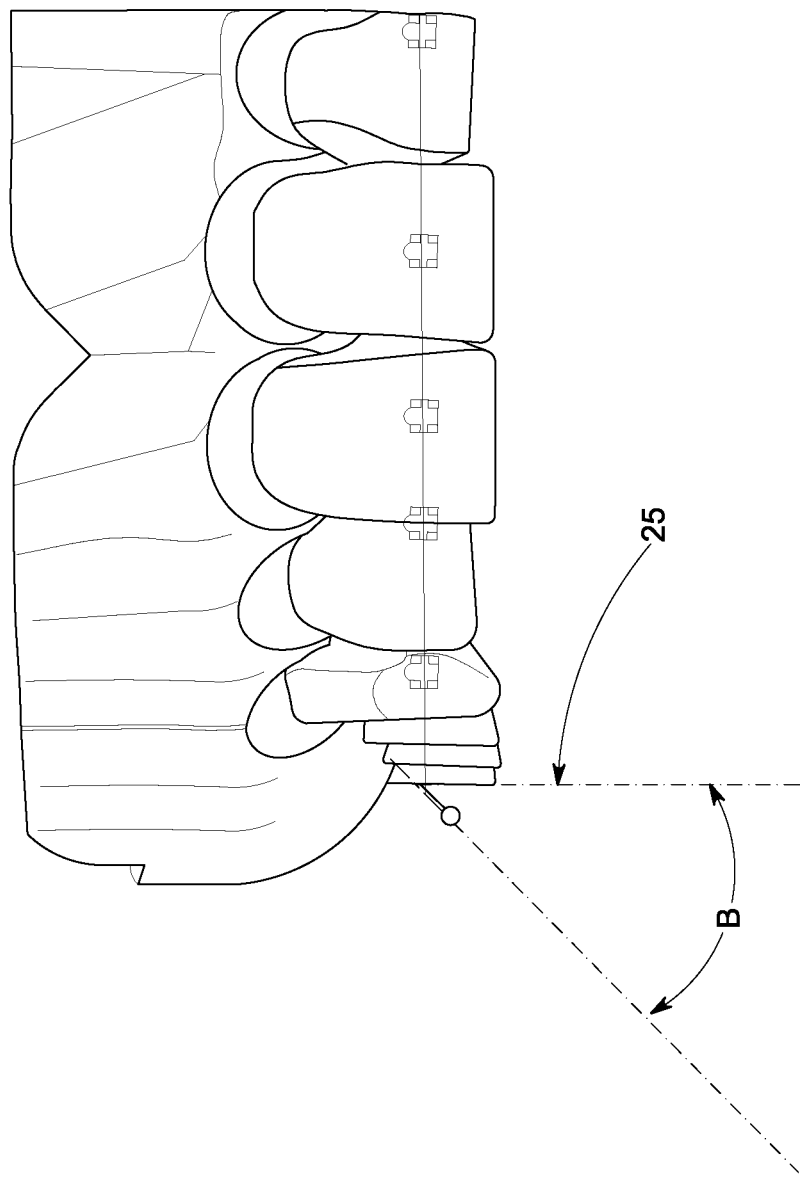

ORTHODONTIC APPLIANCE

CROSS-REFERENCE TO RELATED APPLICATIONS

The present patent application claims the benefits of priority to U.S. Provisional Patent Application No. 62/381,364, entitled "Temporary Orthodontic Appliance to Translate Teeth in the Mouth and Orthodontic Method Thereof" and filed at the USPTO on Aug. 30, 2016, which is hereby incorporated by reference.

FIELD OF THE INVENTION

The present invention generally relates to orthodontic appliances, more specifically to orthodontic appliances, and related methods thereof, for exerting pressure on teeth in the mouth of a patient.

BACKGROUND OF THE INVENTION

Orthodontic movement is typically carried via brackets, archwires, bonds and bands. Forces that can be delivered to the teeth via such orthodontic devices are however limited. When larger forces are required to be applied to the teeth, anchorage devices and/or headgears have been used, but have shown shortcomings. For example, anchorage devices often require large areas of reciprocal anchorage and/or certain fixation to the patient's mouth that is not conducive to ease of installment and/or removal. Conversely, headgears have shown poor patient compliance.

There is therefore an ongoing need for orthodontic appliances that can apply a desired force to teeth of a patient. There is also an ongoing need for orthodontic appliances, whose operation can be, fairly easily and inconspicuously, started/stopped by a patient.

SUMMARY OF THE INVENTION

In one aspect, there is provided an orthodontic appliance for installation on an archwire running along an archwire axis, the orthodontic appliance comprising two archwire sliding parts, the archwire sliding parts being co-axial with the archwire axis; a telescoping assembly linking the two archwire sliding parts to one another, the telescoping assembly being offset from the archwire axis; an external force conveyer; and a spring secured to one of the archwire sliding parts.

The archwire sliding parts may be hollow tubes. The archwire sliding parts may have a converging-diverging internal profile. The archwire sliding parts may have an internal profile that is similar to an external profile of an archwire. The archwire sliding part that is secured to the spring may have a threaded external profile.

The telescoping assembly may comprise a shaft and a tube, wherein the shaft is dimensioned to slideably fit within the tube. The telescoping assembly may be adapted so that the shaft and the tube can be crimped to one another.

The external force conveyer may be a ball clasp.

The spring may be made of nickel titanium.

In another aspect, there is provided an orthodontic appliance for installation on an archwire connecting orthodontic brackets, the orthodontic appliance comprising two archwire sliding parts, the archwire sliding parts being adapted to slide along the archwire; a telescoping assembly linking the two archwire sliding parts to one another, the telescoping assembly being adapted to straddle an orthodontic bracket when in use; an external force conveyer; and a spring secured to one of the archwire sliding parts.

In a further aspect, there is provided a method for exerting pressure on a target orthodontic bracket that is connected to adjacent orthodontic brackets by an archwire, the method comprising:
  a) providing an orthodontic appliance comprising two archwire sliding parts, a telescoping assembly linking the two archwire sliding parts to one another, an external force conveyer and a spring secured to one of the archwire sliding part;
  b) positioning the archwire sliding parts on either side of an adjacent orthodontic bracket;
  c) abutting the spring against the target orthodontic bracket; and
  d) applying a force, against the external force conveyer, sufficient to compress the spring.

The telescoping assembly may be used to obtain a desired distance between the archwire sliding parts. The telescoping assembly may comprise a shaft that slideably fits inside a tube and the method may further comprise crimping the shaft and the tube to one another once the desired distance is achieved.

The external force conveyer may be a ball clasp and the applying of a force against the external force conveyer may be accomplished by attaching an inter-arch orthodontic band to the ball clasp.

Further details of these and other aspects of the subject matter of this application will be apparent from the detailed description and drawings included below.

BRIEF DESCRIPTION OF THE DRAWINGS

Reference is now made to the accompanying figures in which:

FIG. 8C illustrates the orthodontic appliance of FIG. 7 installed on the teeth of a patient and FIG. 9 is a side section view of an orthodontic appliance pursuant to an alternate embodiment of the invention.

DETAILED DESCRIPTION

A novel orthodontic appliance will be described hereinafter. Although the invention is described in terms of specific illustrative embodiment(s), it is to be understood that the embodiment(s) described herein are by way of example only and that the scope of the invention is not intended to be limited thereby.

Figure 1:
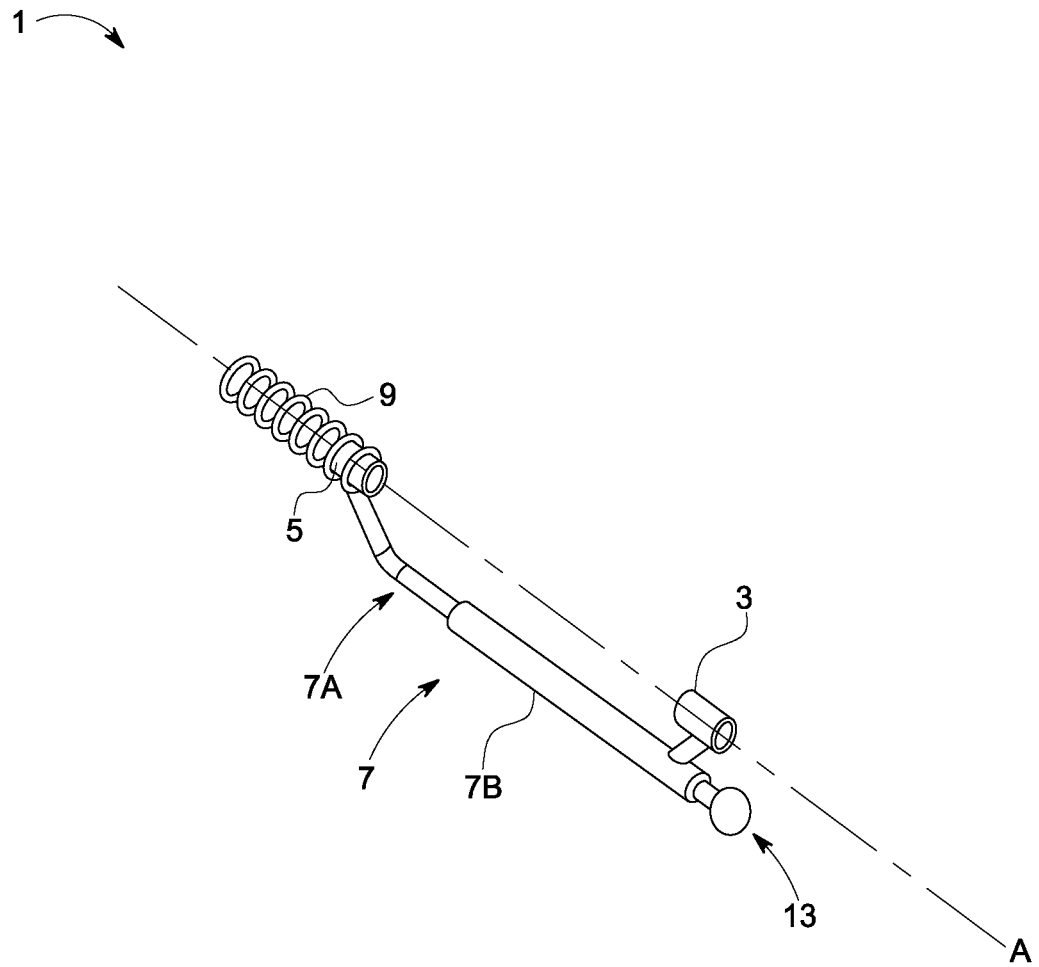
FIG. 1 is a perspective view of an orthodontic appliance pursuant to an embodiment of the invention.
Figure 3A:
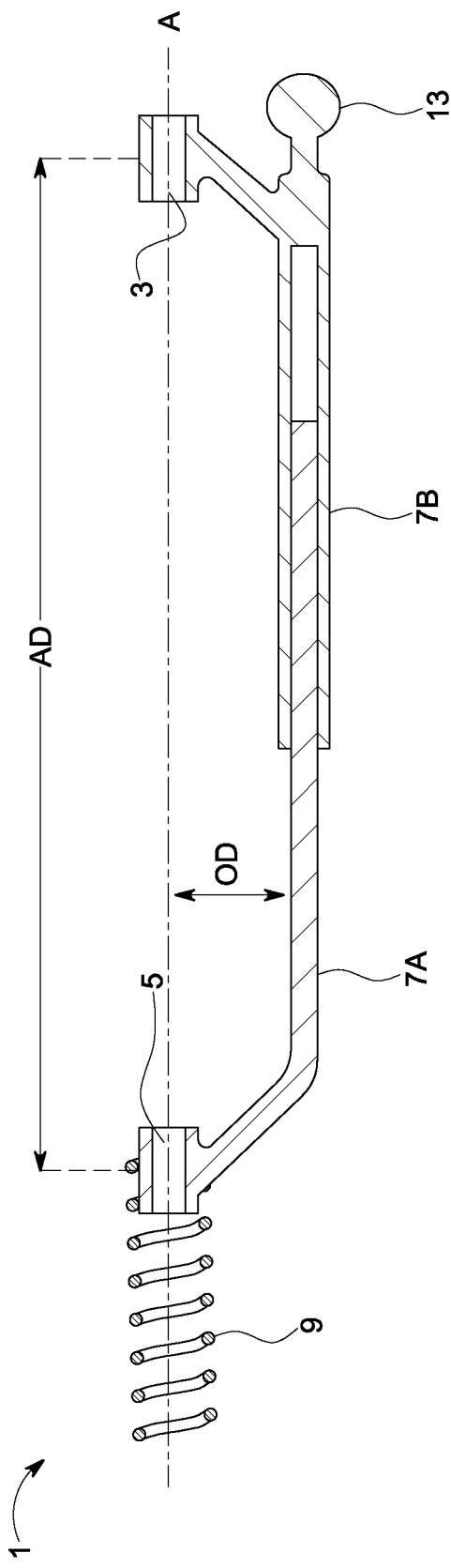
FIG. 3A is a side section view of the orthodontic appliance of FIG. 1.
Figure 3B:
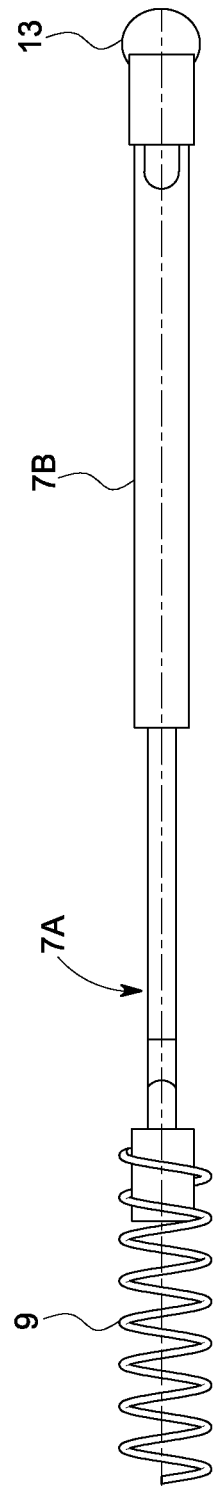
FIG. 3B is a top view of the orthodontic of FIG. 1.
Figure 4:
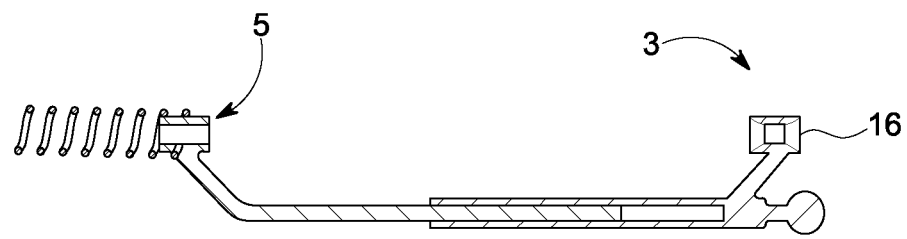
FIG. 4 is a side section view of an orthodontic appliance pursuant to an alternate embodiment of the invention.
Figure 6A:
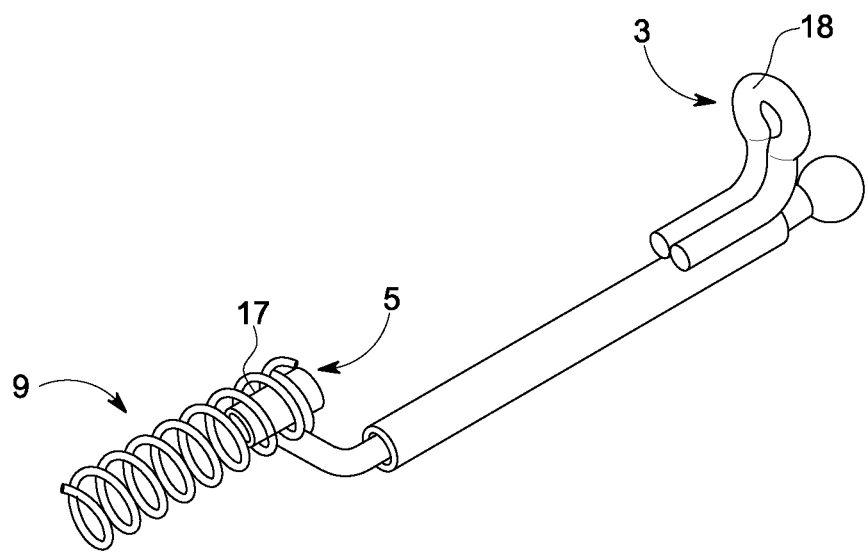
FIG. 6A is a perspective view of an orthodontic appliance pursuant to an alternate embodiment of the invention.
Figure 6B:
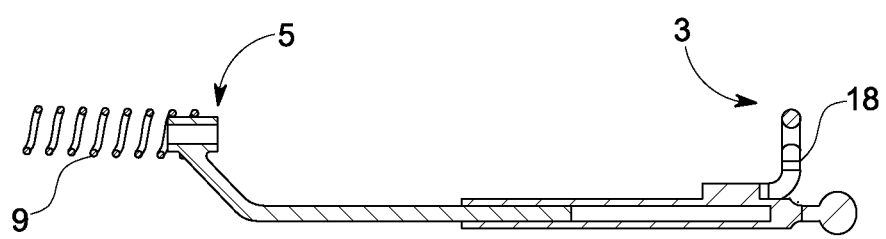
FIG. 6B is a side section view of the orthodontic appliance of FIG. 6A.
Figure 7:
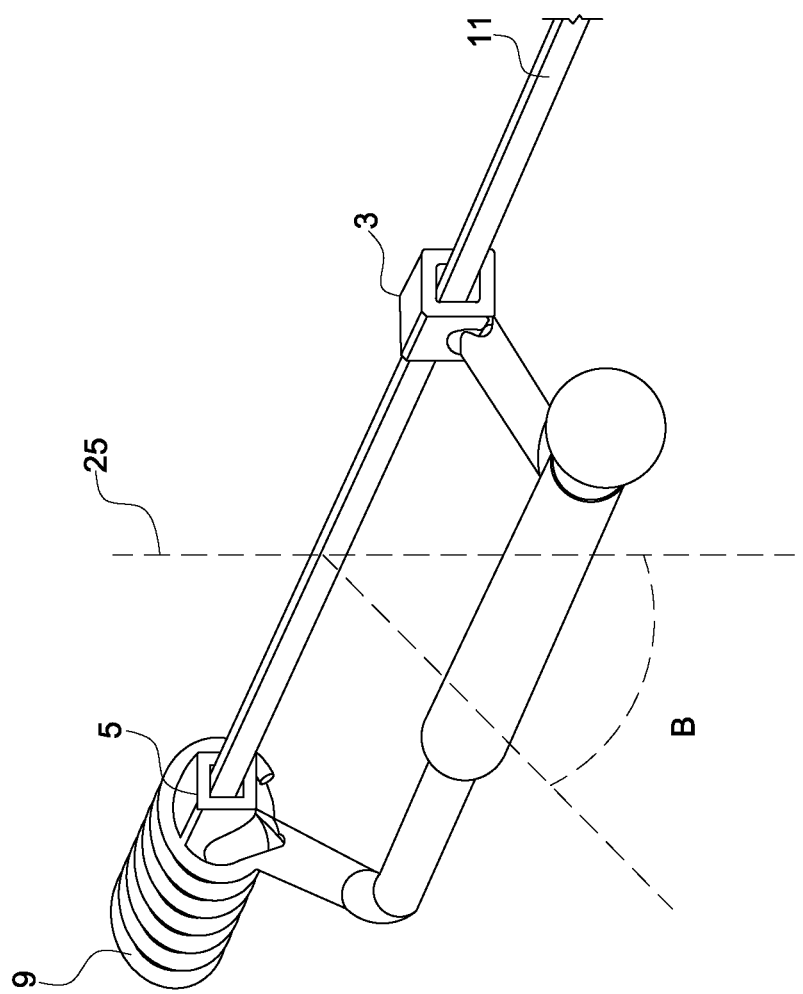
FIG. 7 is a perspective view of an orthodontic appliance pursuant to an alternate embodiment of the invention.

FIG. 1 illustrates an orthodontic appliance 1 pursuant to a first embodiment of the invention. Orthodontic appliance 1 comprises a first archwire sliding parts 3 and a second archwire sliding parts 5, both archwire sliding parts 3, 5 being co-axial with an archwire expected axis A; archwire expected axis A runs along the anticipated path of the archwire 11 (not shown here) upon which orthodontic appliance 1 is meant to be installed. Archwire sliding parts 3, 5 are hollow with an internal profile suitable to allow proper sliding along an archwire. Such internal profile can take many forms. As shown in FIG. 3A, it can take the form of a hollow tube with a straight profile. Alternatively, as shown in FIG. 4 with respect to first archwire sliding part 3, it can take the form of a tube with an internal chamfer profile 16 i.e. it has an internal converging-diverging profile. Further alternatively, as shown in FIGS. 6A-B with respect to first archwire sliding part 3, it can take the form of a ring 18, consisting of a bent and welded wire to achieve the proper profile. As can be understood, the internal profile of sliding part 3, 5 is preferably similar to the external profile of the archwire 11 upon which it is meant to be installed. By "similar" profile, it is not meant that both profiles must be identical; it is meant that both profiles should be "similar" enough so that a slide fit between the relevant parts is possible. Consequently, as shown in FIG. 7 whereas the external profile of the archwire 11 is square-shaped, the internal profile of sliding part 3, 5 is similarly squared-shaped. It should be noted that a non-round external profile of the archwire 11 enables orthodontic appliance 1 to be positioned away from buccal surface 25 of teeth 24 during use. Indeed, as shown in FIGS. 7 & 8C, it is possible to have orthodontic appliance 1 be at a certain angle B from buccal surface 25 by ensuring that the inside profile of archwire sliding parts 3, 5 are such that, when installed on archwire 11, telescoping assembly 7 (described below) angles away from buccal surface 25 of teeth 14.

Figure 9:
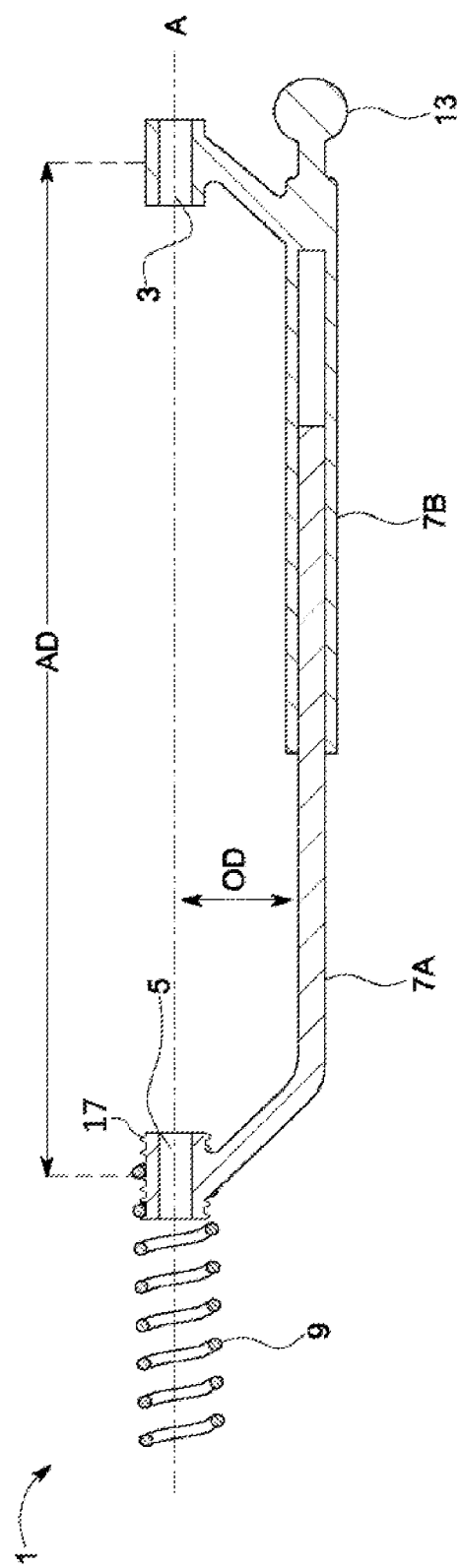

As stated above, spring 9 is secured to second archwire sliding part 5. This can be done in various ways. For example, spring 9 can be welded or bonded to archwire sliding part 5. Furthermore, as shown in FIG. 6A 6B, the external feature of second archwire sliding part 5 can have a mating assembly feature 17 so that spring 9 is first connected to such feature and then welded/bonded to archwire sliding part 5. The mating assembly 17 may be without threads, or, as seen in the embodiment of FIG. 9, the mating assembly feature 17 is a set of external threads dimensioned to receive the internal thread-like profile of spring 9.

As shown in FIG. 1, orthodontic appliance 1 further comprises a telescoping assembly 7 linking archwire sliding parts 3, 5 to one another. As is more clearly shown in FIG. 3A, telescoping assembly 7 is offset from archwire expected axis a sufficient offset distance OD to allow proper movement within the mouth of a patient. More specifically, with respect to the embodiment shown in FIG. 1, in order to minimize pendulum or tipping effect of orthodontic appliance 1 while in operation I a patient's mouth, archwire sliding parts 3, 5 are installed on either side of a bracket (bracket 14B in the embodiment shown in FIG. 8B), with the result that orthodontic appliance 1, more specifically telescoping assembly 7, must straddle such bracket 14B; consequently, telescoping assembly 7 is offset from archwire expected axis a sufficient offset distance OD to clear such bracket 14B during operation in a patient's mouth. In the current embodiment, telescoping assembly 7 is offset 3.5 mm from archwire expected axis A (i.e. OD=3.5 mm), but it is understood that other offset distances OD are possible pursuant to the invention depending on its application.

Figure 5:
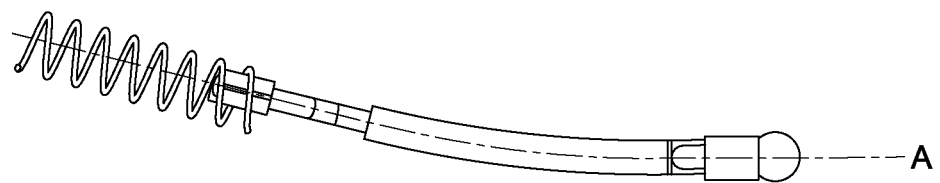
FIG. 5 is a top view of an orthodontic appliance pursuant to an alternate embodiment of the invention.

Whereas telescoping assembly 7 is shown to be substantially straight in FIG. 1, it does not have to be so; indeed, as shown in FIG. 5, whereas archwire expected axis A can have a certain curvature, so can telescoping assembly 7 can have a certain curvature. Care must however be taken that such curvature does not impede the proper functioning of telescoping assembly 7.

Figure 2:
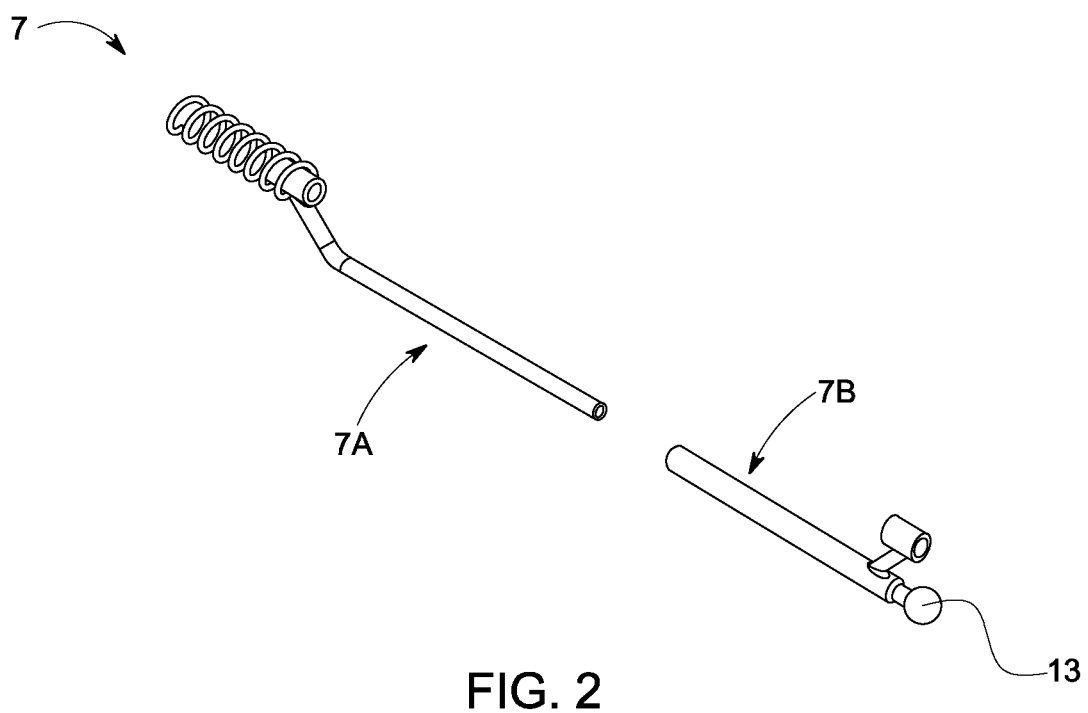
FIG. 2 is an exploded views of the orthodontic appliance of FIG. 1.

As shown in FIGS. 2 and 3A, telescoping assembly 7 comprises a telescoping shaft 7A that slideably fits within telescoping tube 7B. Both telescoping parts 7A, 7B are long enough to allow the necessary flexibility in the axial distance AD between both archwire sliding parts 3, 5. Indeed, as will be seen below, this flexibility in the axial distance AD between both archwire sliding parts 3, 5 will be useful when orthodontic appliance 1 will be installed in a patient's mouth, more specifically when archwire sliding parts 3, 5 will be installed between brackets 14.

In the embodiment shown in FIG. 1, each distal extremity of telescoping assembly 7 is connected to each archwire sliding part 3, 5 at a certain angle. Although an angle of approximately 45 deg. Is shown in the current embodiment, other angles are possible pursuant to the invention. It is understood that low angles have a positive effect on the force transfer efficiency of orthodontic appliance 1, but a negative effect on how compact orthodontic appliance 1 can be and vice-versa for high angles.

Orthodontic appliance 1 further comprises ball clasp 13. Ball clasp 13 is profiled so as to be able to receive an orthodontic device that will impart a force on orthodontic appliance 1. As shown in FIG. 1 (and FIG. 8B), ball clasp 13 is profiled so as to be able to receive an orthodontic band 15; however, other profiles and, more generally, other devices that can convey external forces (for ease of reference, other external force conveyers), are possible, as other orthodontic devices can impart a force on orthodontic appliance 1 (such as, for example, a headgear).

Orthodontic appliance 1 further comprises a spring 9 secured to second archwire sliding part 5. As will be described below, when orthodontic appliance 1 is installed in a patient's mouth, spring 9 will abut against the bracket 14 (against which a force is desired to be applied). More specifically, spring 9, as it transfers the force that is applied to ball clasp 13 to the tooth 24 where bracket 14 is attached, will provide some dampening effect so that substantially continuous forces are applied to the relevant tooth 24. In the current embodiment, spring 9 is a coil spring but it is understood that any other type of spring is possible pursuant to the invention; the choice of the type of spring to be used will depend on the specific requirements of the force to be applied to the tooth 24. For example, if it is important that a constant force always be applied to the tooth 24, a constant force spring will be used. In the current embodiment, spring 9 is made of nickel titanium and has a length of approximately 5 mm, but it is understood that any other type of suitable material and length is possible pursuant to the invention. An advantage of having a longer than needed spring is that it allows flexibility during orthodontic appliance 1's installation process in the patient's mouth, in that such spring 9 can be cut/modified.

In the embodiment shown in FIG. 1, ball clasp 13 is located at one distal extremity of telescoping assembly 7 whereas spring 9 is attached to the archwire sliding part 5 located at the other distal extremity of telescoping assembly 7. It is believed that the axially further away ball clasp 13 is located from spring 9, the more efficient orthodontic appliance 1 will be at transforming forces applied to ball clasp 13 into translational forces on the relevant tooth. Therefore, although it is possible pursuant to the invention to have ball clasp 13 located elsewhere on orthodontic appliance 1 (besides at a distal extremity of telescoping assembly opposite distal extremity of telescoping assembly 7 where spring 9 is attached), the effect on the eruption forces on the relevant tooth will need to be taken into account.

Figure 8A:
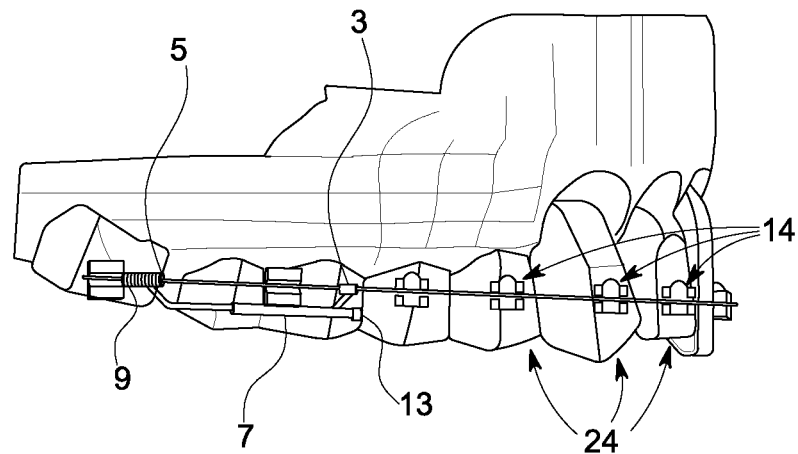
FIG. 8A illustrates the orthodontic appliance of FIG. 1 installed on the teeth of a patient.
Figure 8B:
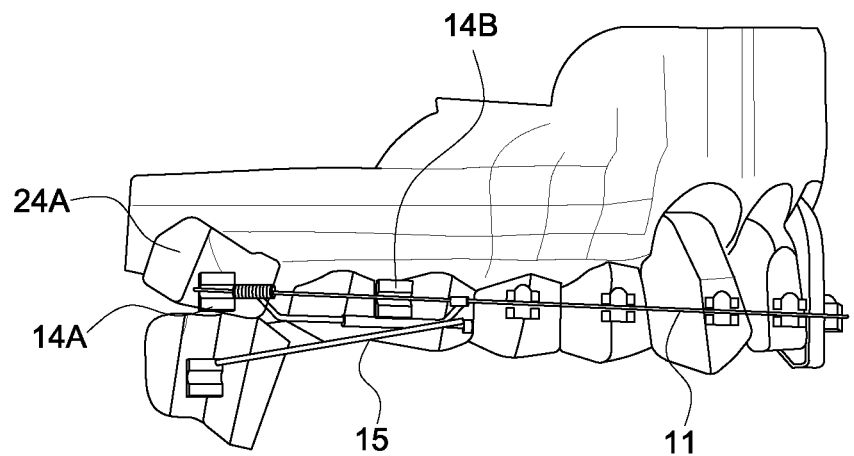
FIG. 8B illustrates the orthodontic appliance of FIG. 1 installed on the teeth of a patient and linked to an orthodontic band.

With reference to FIGS. 8A-B-C, the positioning of orthodontic appliance 1 in a patient's mouth will be described. Second archwire sliding part 5, more specifically the archwire sliding part where spring 9 is attached, is positioned proximate first bracket 14A against which pressure is desired to be applied, between first bracket 14A and second bracket 14B. First archwire sliding part 3, more specifically the archwire sliding part with no spring 9 attached to it, is positioned on the other side of second bracket 14B, resulting in telescoping assembly 7 straddling such bracket 14B. The length between both archwire sliding parts 3, 5 (described above as axial distance AD) is adjusted so as to ensure that:

when a force is applied to ball clasp 13 (in the current embodiment, this is done via orthodontic band 15 that is attached to a bracket positioned on the opposite arch—it should be noted that it is possible, pursuant to the invention, to have other devices apply the required force to ball clasp 13; indeed, the required force can be applied through the use of skeletal, dental or muscular components, either intra arch or inter arch, either intra oral or extra oral; indeed, not only intra oral inter arch elastomeric modules can be used, but extra oral headgear or fixed temporary anchorage devices can be used), spring 9 is compressed and consequently transfers force to first bracket 14A (and to the tooth 24A to which it is attached), and when no force is applied to ball clasp 13 (in the current embodiment, this would occur when orthodontic band 15 is removed), spring 9 is not compressed and consequently transfers no force to first bracket 14A (and to the tooth 24A to which it is attached)—a patient can therefore fairly easily and inconspicuously start/stop orthodontic appliance 1's operation.

As outlined above, the proper axial distance AD between both archwire sliding parts 3, 5 is achieved via telescoping assembly 7, more specifically by sliding telescoping shaft 7A inside telescoping tube 7B. Once the proper axial distance AD is achieved, telescoping shaft 7A and telescoping tube 7B are crimped to one another. It is however understood that other types of telescoping assemblies are possible pursuant to the invention.

An example of a method for installing orthodontic appliance 1 inside a patient's mouth is as follows:

1) Orthodontic brackets 14 are positioned and bonded to the teeth 24; initial levelling and alignment of the teeth 24 are performed;
2) The two parts of telescoping assembly 7 (i.e. telescoping shaft 7A and telescoping tube 7B) are telescoped into one another and slid onto an archwire 11;
3) Archwire 11 is installed into brackets 14 and spring 9 is placed against tooth 24A (or segments of teeth) that is (are) to receive the active force;
4) Orthodontic appliance 1, more specifically telescoping assembly 7, is adjusted and crimped in order that teeth adjacent to tooth 24A remain passive and free of any reciprocal forces;
5) Orthodontic appliance 1 is activated by compression of spring 9 by attaching an inter-arch orthodontic band 15 to ball clasp 13.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. An orthodontic appliance for installation on an archwire running along an archwire axis within one arch, the orthodontic appliance comprising:
   two archwire sliding parts, the archwire sliding parts being co-axial with the archwire axis when installed on the archwire;
   a telescoping assembly linking the two archwire sliding parts to one another, the telescoping assembly being offset from the archwire axis;
   an external force conveyer; and
   a spring secured to one of the archwire sliding parts and configured to encircle the archwire,
   wherein the spring is used to directly dampen forces uni-axial to the archwire axis between the archwire sliding part to which it is secured to and a tooth.

2. The orthodontic appliance as defined in claim 1, wherein the archwire sliding parts are hollow tubes.

3. The orthodontic appliance as defined in claim 2, wherein the archwire sliding parts have a converging-diverging internal profile.

4. The orthodontic appliance as defined in claim 1, wherein the archwire has an external profile and the archwire sliding parts have an internal profile that is similar to said archwire external profile.

5. The orthodontic appliance as defined in claim 4, wherein the archwire sliding part secured to the spring has a threaded external profile.

6. The orthodontic appliance as defined in claim 4, wherein the telescoping assembly comprises a shaft and a tube, wherein the shaft is dimensioned to slideably fit within the tube.

7. The orthodontic appliance as defined in claim 4, wherein the external force conveyer is a ball clasp.

8. The orthodontic appliance as defined in claim 1, wherein the archwire sliding part secured to the spring has a threaded external profile.

9. The orthodontic appliance as defined in claim 1, wherein the telescoping assembly comprises a shaft and a tube, wherein the shaft is dimensioned to slideably fit within the tube.

10. The orthodontic appliance as defined in claim 9, wherein the telescoping assembly is adapted so that the shaft and the tube can be crimped to one another to prevent translation of the shaft in the tube.

11. The orthodontic appliance as defined in claim 9, wherein the external force conveyer is a ball clasp.

12. The orthodontic appliance as defined in claim 1, wherein the external force conveyer is a ball clasp.

13. The orthodontic appliance as defined in claim 1, wherein the spring is made of nickel titanium.

14. An orthodontic appliance for installation on an archwire connecting orthodontic brackets, the orthodontic appliance comprising:
    two archwire sliding parts, the archwire sliding parts being adapted to slide along the archwire;

a telescoping assembly linking the two archwire sliding parts to one another, the telescoping assembly being adapted to straddle an orthodontic bracket when in use;

an external force conveyer; and a spring secured to one of the archwire sliding parts and configured to encircle the archwire, wherein the spring is used to directly dampen forces uni-axial to the archwire axis between the archwire sliding part to which it is secured to and an orthodontic bracket.

15. The orthodontic appliance as defined in claim 14, wherein the archwire sliding parts have an internal profile that is adapted to slideably with an external profile of the archwire.

16. The orthodontic appliance as defined in claim 15, wherein the archwire sliding part secured to the spring has an external profile that is similar to an internal profile of the spring.

17. A method for exerting pressure on a target orthodontic bracket that is connected to adjacent orthodontic brackets by an archwire, the method comprising:

a) providing an orthodontic appliance comprising two archwire sliding parts, a telescoping assembly linking the two archwire sliding parts to one another, an external force conveyer and a spring secured to one of the archwire sliding part;

b) positioning the archwire sliding parts on either side of one of the adjacent orthodontic brackets;

c) abutting the spring against the target orthodontic bracket, the spring configured to encircle the archwire; and d) applying a force, against the external force conveyer, sufficient to compress the spring.

18. The method as defined in claim 17, further comprising using the telescoping assembly to obtain a desired distance between the archwire sliding parts.

19. The method as defined in claim 18, wherein the telescoping assembly comprises a shaft that slideably fits inside a tube, the method further comprising crimping the shaft and the tube to one another once the desired distance is achieved.

20. The method as defined in claim 17, wherein the external force conveyer is a ball clasp and the applying of a force against the external force conveyer is accomplished by attaching an inter arch orthodontic band to the ball clasp.

* * * * *